Oct. 2, 1928.

G. C. ST. LOUIS

AEROPLANE

Filed June 18, 1927

1,685,888

INVENTOR
George C. St Louis
BY
ATTORNEY

Patented Oct. 2, 1928.

1,685,888

UNITED STATES PATENT OFFICE.

GEORGE C. ST. LOUIS, OF FRESNO, CALIFORNIA, ASSIGNOR OF ONE-HALF TO FRANCIS A. SPOONER, OF WILLOWS, CALIFORNIA.

AEROPLANE.

Application filed June 18, 1927. Serial No. 199,817.

This invention relates to improvements in aeroplanes and particularly to the arrangement and mounting of the wings or supporting surfaces. The principal objects of my invention are to provide a wing arrangement so that the plane will have great lifting power with a small wing area enabling a relatively great load to be carried; the wings being small may be made very strong and I eliminate the need of struts, brace wires and the like, thus saving power by cutting down head resistance. The wings being narrow the machine may alight without interference in relatively narrow areas such as ordinary highways. The wings being arranged to have great lifting power the fuselage may be built large and deep so as to enable it to float properly on water with perfect safety when necessary. The wings are so mounted as to be movable relative to the fuselage in such a manner that the angle of ascent and descent of the plane can be more simply and accurately controlled with less expenditure of power than is at present the case, resulting in my improved aeroplane being much safer than those now in use. Also the wings are arranged relative to each other so that the lifting power may be easily gaged while in flight and the speed materially increased, and the machine as a whole is very stable and consequently extremely safe, since it will not have any tendency to tip over.

A further object of the invention is to provide a simple and inexpensive device and yet one which will be exceedingly effective for the purpose for which it is designed.

These objects I accomplish by means of such structure and relative arrangement of parts as will fully appear by a perusal of the following specification and claims.

In the drawings similar characters of reference indicate corresponding parts in the several views.

Figure 1:
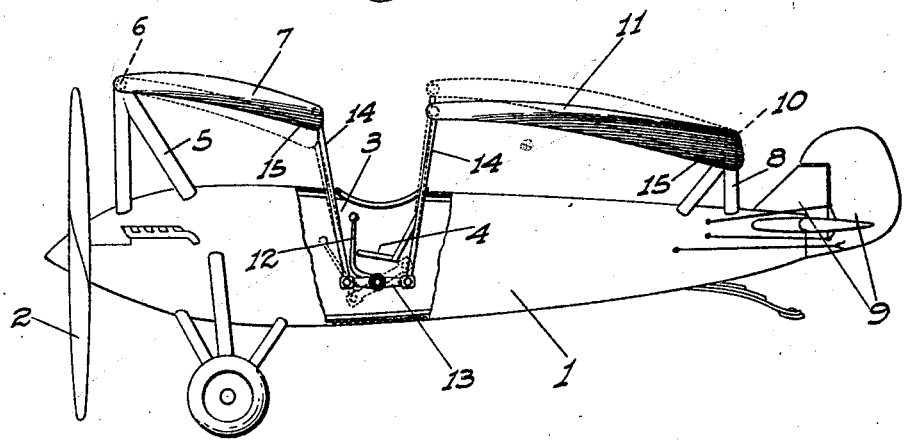
Fig. 1 is a side elevation of my improved aeroplane.
Figure 2:
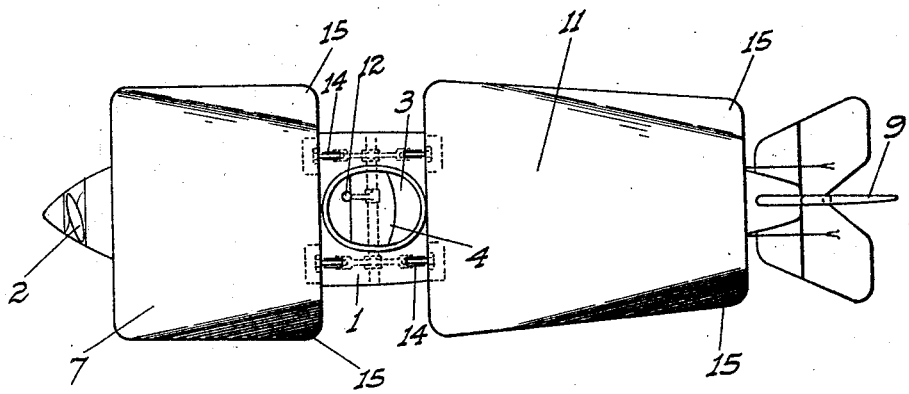
Fig. 2 is a top plan view of the same.
Figure 3:
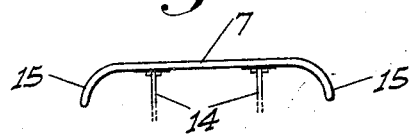
Fig. 3 is a rear end view of the forward wing detached.

Referring now more particularly to the characters of reference on the drawings, the numeral 1 denotes the fuselage, preferably of the usual torpedo shape having a tractor propeller 2 at its nose. The fuselage is provided intermediate its ends with a cock pit 3 having a seat 4 for the aviator.

Projecting upwardly from the fuselage at the front is a rigid support or bracket 5 on which is transversely hinged as at 6 the forward end of the forward wing 7 of the aeroplane. A similar bracket 8 projects upwardly from the rear of the fuselage just ahead of the usual rudder structure 9. Hinged transversely onto this bracket as at 10 is the rear end of the rear wing 11, which is disposed in substantially the same horizontal plane as the forward wing. The two wings are preferably spaced apart somewhat from each other lengthwise of the fuselage, and their areas are so designed and proportioned relative to the weight of said fuselage as to provide an equal and proper balance for the latter, practically from end to end. Both wings are much narrower and of smaller area than those at present used, such size being possible by reason of their mounting and control arrangement now to be described.

Such control means comprises a longitudinally swingable lever or joy stick 12 mounted in the cock pit in a position convenient to the aviator. Substantially horizontal arms 13 project fore and aft from the pivotal connection of the lever and are mounted in fixed connection therewith; members 14 of a suitable nature extending between the ends of said arms and the corresponding free ends of the wings. The wings are normally disposed with a certain downward slope from front to rear and it will be seen that when the lever is shifted forward this slope of the wings will be increased simultaneously, since the free rear end of the forward wing will be lowered, while the free forward end of the rear wing will be raised relative to the fuselage.

The entire area of the wings will be therefore disposed at a suitable angle to the air stream created by the propeller so that the desired great lifting power is obtained, enabling the machine to rise easily and rapidly from the air, and to maintain such position in the air with but very little power. The angle of the wings being alterable at any time while the machine is in flight, the lifting effort of the machine at such time is easily governed and the speed may be materially increased, since not so much power of the engine is used in merely preventing the machine from dropping.

I also obtain additional lifting power by bending or angling the sides of the wings downwardly to a gradually increasing extent from front to rear as indicated at 15. This causes the air stream from the propeller to be engaged by such bent parts and deflected inwardly toward the transverse center of the wings. This of course adds to the lifting power of the machine.

The fuselage, wings and all other parts are preferably made of metal throughout, so that the aeroplane is fireproof.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention as defined by the appended claims.

Having thus described my invention what I claim as new and useful and desire to secure by Letters Patent is:

1. An aeroplane including a fuselage, separate longitudinally spaced wings disposed above the fuselage, supports projecting upwardly from the fuselage adjacent its opposite ends, hinge connections between said supports and the front and rear ends of the front and rear wings respectively, and means for turning the wings on their hinge connections at will.

2. An aeroplane including a fuselage, separate longitudinally spaced wings disposed above the fuselage, supports projecting upwardly from the fuselage adjacent its opposite ends, hinge connections between said supports and the front and rear ends of the front and rear wings respectively, and means for turning the wings on their hinge connections simultaneously to cause the wings to be disposed at varying downward slopes from front to rear relative to the fuselage.

3. An aeroplane including a fuselage, separate longitudinally spaced wings disposed above the fuselage, supports projecting upwardly from the fuselage adjacent its opposite ends, hinge connections between said supports and the front and rear ends of the front and rear wings respectively, and means for turning the wings on their hinge connections simultaneously to cause the wings to be disposed at varying downward slopes from front to rear relative to the fuselage, while maintaining them at a substantially common angle relative to a horizontal plane.

4. An aeroplane including a fuselage, separate longitudinally spaced wings disposed above the fuselage, supports projecting upwardly from the fuselage adjacent its opposite ends, hinge connections between said supports and the front and rear ends of the front and rear wings respectively, means for turning the wings on their hinge connections at will, such means comprising a pivoted operating lever mounted in the fuselage, and connections between said lever and the wings arranged to cause the free ends of the front and rear wings to be lowered and raised simultaneously relative to the fuselage.

In testimony whereof I affix my signature.

GEORGE C. ST. LOUIS.